(12) United States Patent
Hase et al.

(10) Patent No.: US 6,646,205 B2
(45) Date of Patent: Nov. 11, 2003

(54) ELECTRICAL WIRE HAVING A RESIN COMPOSITION COVERING

(75) Inventors: Tatsuya Hase, Yokkaichi (JP);
Takahiko Sugita, Yokkaichi (JP);
Hiroshi Fujimoto, Yokkaichi (JP);
Masashi Sato, Yokkaichi (JP); Shinichi Matsumoto, Yokkaichi (JP)

(73) Assignees: Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/012,423

(22) Filed: Dec. 12, 2001

(65) Prior Publication Data

US 2002/0112875 A1 Aug. 22, 2002

(51) Int. Cl.$^7$ ................................. H01B 3/00
(52) U.S. Cl. ................................... 174/110 R
(58) Field of Search ............. 174/110 R, 120 C, 174/120 SR, 110 SR, 118; 524/436, 433, 430

(56) References Cited

U.S. PATENT DOCUMENTS

| | | |
|---|---|---|
| 3,294,868 A | 12/1966 | Pritchard |
| 3,737,557 A | 6/1973 | Verne et al. |
| 3,793,283 A | 2/1974 | Frailey et al. |
| 4,361,507 A | 11/1982 | Bourland |
| 4,361,508 A | 11/1982 | Bourland |
| 4,386,187 A | 5/1983 | Grancio et al. |
| 4,386,188 A | 5/1983 | Grancio et al. |
| 4,622,350 A | 11/1986 | Icenogle et al. |
| 4,622,352 A | 11/1986 | Djiauw et al. |
| 4,722,858 A | 2/1988 | Harbourne et al. |
| 4,734,450 A | 3/1988 | Kawai et al. |
| 4,794,132 A | 12/1988 | Djiauw et al. |
| 4,839,412 A | 6/1989 | Harrell et al. |
| 4,853,154 A | 8/1989 | Icenogle et al. |
| 4,859,366 A | 8/1989 | Djiauw et al. |
| 4,871,805 A | 10/1989 | Shimomura et al. |
| 4,876,147 A | 10/1989 | Schlag et al. |
| 4,918,127 A | 4/1990 | Adur et al. |
| 4,987,173 A | 1/1991 | Nomura et al. |
| 4,990,554 A | 2/1991 | Nomura et al. |
| 5,045,589 A | 9/1991 | Ueno |
| 5,077,327 A | 12/1991 | Cecchin et al. |
| 5,166,250 A | 11/1992 | Breant |
| 5,180,889 A | 1/1993 | Rogers et al. |
| 5,250,226 A * | 10/1993 | Oswal et al. ............... 252/500 |
| 5,354,795 A | 10/1994 | Ueno et al. |
| 5,418,272 A | 5/1995 | Kawabata et al. |
| 5,451,919 A * | 9/1995 | Chu et al. ................. 338/22 R |
| 5,508,323 A | 4/1996 | Romenesko et al. |
| 5,561,185 A | 10/1996 | Hashimoto et al. |
| 5,747,574 A | 5/1998 | Kanamori |
| 5,760,141 A | 6/1998 | Watanabe et al. |
| 5,985,973 A | 11/1999 | Sumitomo et al. |

(List continued on next page.)

FOREIGN PATENT DOCUMENTS

| | | |
|---|---|---|
| DE | 199 41 181 A1 | 5/2000 |
| DE | 199 41 180 A1 | 3/2001 |
| EP | 0 249 010 A2 | 12/1987 |

(List continued on next page.)

*Primary Examiner*—Chau N. Nguyen
(74) *Attorney, Agent, or Firm*—Oliff & Berridge, PLC

(57) ABSTRACT

An electrical wire and a method of making the electrical wire are provided. The electrical wire includes a conductor and an electrically insulating covering on the conductor. The covering is a resin composition including a first polymer, a second polymer and filler particles. A good balance of properties is achieved. The electrical wire is suitable for use in a vehicle.

14 Claims, 2 Drawing Sheets

U.S. PATENT DOCUMENTS

| | | | |
|---|---|---|---|
| 6,121,363 A | 9/2000 | Sakai et al. | |
| 6,147,152 A | 11/2000 | Kanome et al. | |
| 6,156,836 A | 12/2000 | Iwanami et al. | |
| 6,169,144 B1 | 1/2001 | Higashi et al. | |
| 6,190,772 B1 | 2/2001 | Yamano et al. | |
| 6,255,390 B1 | 7/2001 | Enomoto et al. | |
| 6,277,908 B1 | 8/2001 | Yamamoto | |
| 6,306,972 B1 | 10/2001 | Ohkawa et al. | |
| 6,358,438 B1 * | 3/2002 | Isozaki et al. | 252/511 |

FOREIGN PATENT DOCUMENTS

| | | |
|---|---|---|
| EP | 0 273 516 A2 | 7/1988 |
| EP | 0 370 424 A2 | 5/1990 |
| EP | 0 370 518 A2 | 5/1990 |
| EP | 0 427 352 A1 | 5/1991 |
| EP | 0 490 394 A1 | 6/1992 |
| EP | 0 973 174 A1 | 1/2000 |
| EP | 1 033 384 A2 | 9/2000 |
| EP | 1 100 093 A2 | 5/2001 |
| EP | 1 130 054 A1 | 9/2001 |
| JP | 7-78518 | 2/1989 |
| JP | 7-110912 | 5/1989 |
| JP | 2-53845 | 2/1990 |
| JP | 4-154854 | 5/1992 |
| JP | 5-194795 | 8/1993 |
| JP | 5-301996 | 11/1993 |
| JP | 6-9805 | 1/1994 |
| JP | 6-157842 | 7/1994 |
| JP | 6-192504 | 7/1994 |
| JP | 7-78518 | 3/1995 |
| JP | 7-165997 | 6/1995 |
| JP | 7-176219 | 7/1995 |
| JP | 8-199016 | 8/1996 |
| JP | 9-31267 | 2/1997 |
| JP | 9-33770 | 2/1997 |
| JP | 10-330556 | 12/1998 |
| JP | 2000-315424 | 11/2000 |
| JP | 2000-340034 | 12/2000 |
| WO | WO 99/05688 | 2/1999 |
| WO | WO 99/27015 | 6/1999 |
| WO | WO 99/55776 | 11/1999 |

* cited by examiner

ELECTRICAL WIRE HAVING A RESIN COMPOSITION COVERING

BACKGROUND OF THE INVENTION

1. Field of Invention

This invention relates to an electrical wire having a halogen-free resin composition as an electrically insulating covering on an electrical conductor core.

2. Description of Related Art

Polyvinyl chloride has been much used as the covering material of electrical wire for automobiles, because it is superior in properties such as mechanical strength, extrusion processability, flexibility and coloring property. However, with recent concern for the global environment, halogen-free resin materials have come to be used in the production of automobile parts, including the covering of electrical wires used in automobiles, in place of polyvinyl chloride, because polyvinyl chloride discharges a harmful halogen gas on combustion.

A halogen-free resin composition, in which a metal hydroxide is blended with a polyolefin-based polymer as a flame-retardant, is known as a wear resistant resin composition that does not generate poisonous gases such as halogen gases upon combustion. See, for example, JP-A-7-176219, JP-A-7-78518. So that the flame-retardant resin composition has a self-extinction property, a large quantity of a filler such as a metal hydroxide must be added. However, addition of large quantities of metal hydroxide to the composition causes problems in mechanical strength such as reduced wear resistance, tensile strength, and the like. Also, as the amount of metal hydroxide is increased, water resistance deteriorates and, in particular, electrical properties upon immersion in water deteriorate. Furthermore, when the amount of filler in a resin composition is increased, the composition tends to whiten, particularly upon bending.

In order to prevent a reduction in mechanical strength in a resin composition, it is possible to increase the amounts of a polypropylene having a comparatively high hardness, and a high density polyethylene. However, the flexibility of an electrical wire covered by such a composition and the processability of the composition are reduced.

In order to enhance flexibility of a resin composition, a resin having a low crystalline component content, i.e. having low crystallinity, and a rubber component can be employed. However, such compositions have reduced oil resistance. Alternatively, to enhance flexibility, an elastomer having a low melting point and softening point could be used. Such compositions, however, are deformed at high temperatures and are subject to melt-fusing.

SUMMARY OF THE INVENTION

Accordingly, an object of this invention is to provide an electrical wire having a halogen-free, olefin-based resin as its covering. A further object of this invention is to provide a good balance of properties that are desired in covering materials of electrical wire used, for example, in an automobile. Such properties include water resistance, oil resistance, flexibility at high temperatures, wear resistance, minimal whitening, and the like.

According to this invention there is provided an electrical wire including a conductor and an electrically insulating covering on the conductor. The covering is a resin composition including at least one first polymer, at least one second polymer, and filler particles. The first and second polymers possess at least one of the following features (a), (b) and (c):

(a) the first and second polymers each have an immersion saturated water absorption rate of about 3% or less;

(b) the first polymer has a crystallinity of less than about 50% and the second polymer has a crystallinity of about 50% or more; and (c) the first polymer has a melting point or softening temperature of less than about 100° C. and the second polymer has a melting point or a softening temperature of at least about 100° C.

In various exemplary embodiments, the first and second polymers possess at least two of the features (a), (b) and (c). In various other exemplary embodiments, the first and second polymers possess all three of the features (a), (b) and (c).

Preferably there are no polymer resin components in the resin composition, other than the first and second polymers. Thus, for example, when only a single first polymer and a single second polymer are employed, the first polymer and the second polymer are the only two polymer components present.

According to this invention, there is also provided a method of making electrical wire by mixing the above-described polymer components and filler particles, and applying the resulting resin composition to an electrical conductor as a covering.

These and other features and advantages of this invention are described in, or are apparent from, the following detailed description of various exemplary embodiments of this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
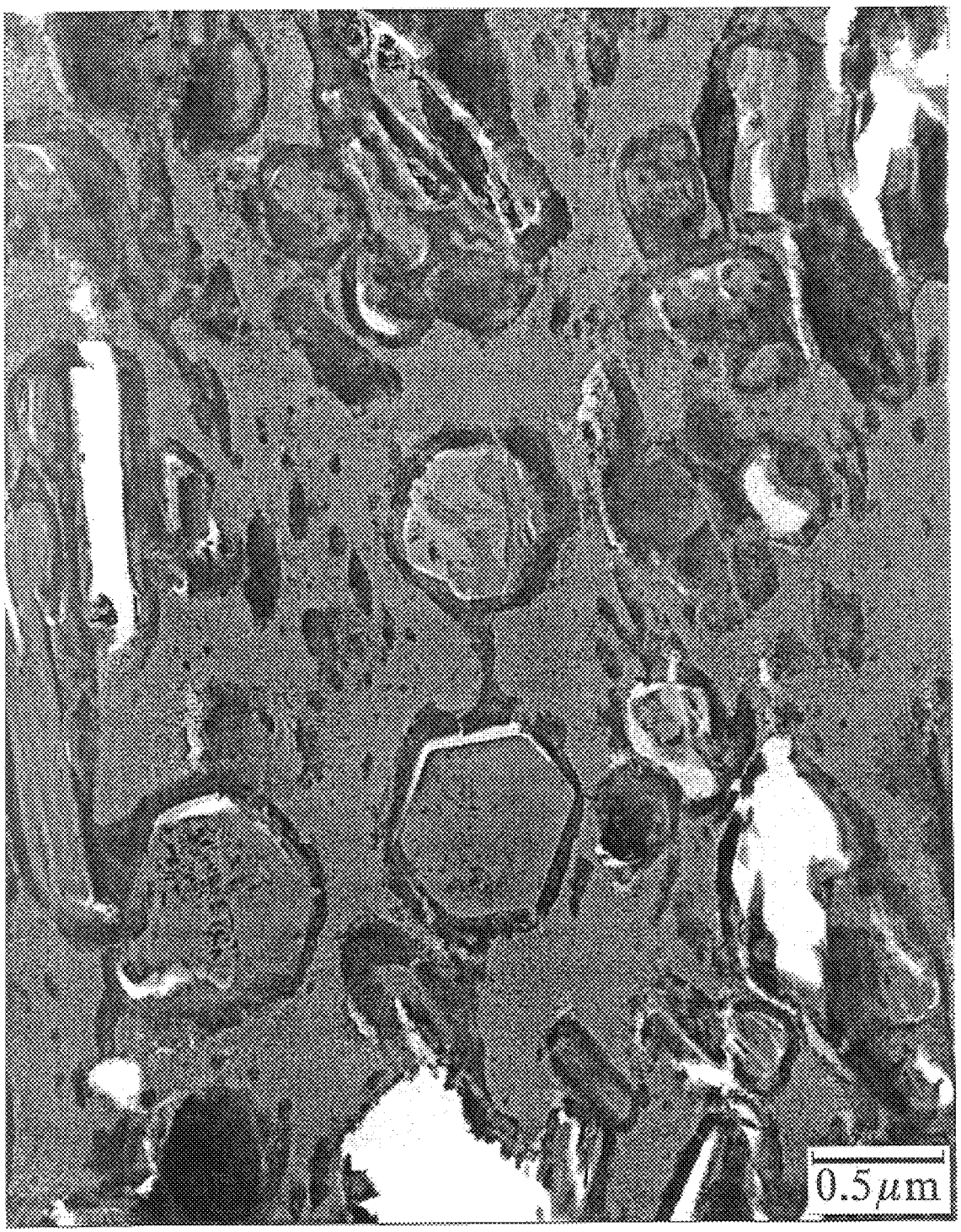
FIG. 1 is an electron micrograph of the structure of the resin composition of Example 38.

The filler used in this invention is preferably fire-resistant and may be either an inorganic filler or an organic filler. Inorganic fillers are preferred. Exemplary inorganic fillers include carbon materials, oxides, hydroxides, carbonates, sulfates, silicates and nitrides of metals. Metals in the above metal compositions can include alkali metals, alkaline earth metals, transition metals, or the like. The metal compositions preferably provide a flame retarding property to the resin composition. The fillers can be used alone or in combination.

Exemplary metal hydroxides include, for example, magnesium hydroxide, aluminum hydroxide, and the like. Such compositions are most preferred as fillers in compositions for coating electric wire because these fillers impart particularly good flame retarding properties to the resin. Preferably, the composition is free from fibrous filler particles. It is also preferred that the metal hydroxide or mixture of metal hydroxides of this invention is the only filler present in the composition.

The filler particles may be untreated or subjected to a surface treatment prior to use in the resin composition of this invention. Exemplary compositions for surface treatment include coupling agents, fatty acids and salts of fatty acids. Coupling agents can include aminosilane coupling agents, vinylsilane coupling agents, epoxysilane coupling agents, methacryloxysilane coupling agents, and the like. Fatty acids and salts can include higher fatty acids (e.g., fatty acids having 12 or more carbon atoms) such as stearic acid, oleic acid and the like, and their salts.

According to feature (a) of this invention, described above, the first and second polymer components are polymers having immersion saturated water absorption rates of about 3% or less, as measured in accordance with JIS K 7209:2000 (ISO 62:1999).

The at least one second polymer employed according to this invention is not particularly limited, provided that it has an immersion saturated water absorption rate of about 3% or less. Exemplary polymers that can be used as second polymers in this invention include propylene homopolymers, propylene block or random copolymers, high density polyethylenes (HDPE), linear low density polyethylenes (LLDPE), low density polyethylenes (LDPE), ultra low density polyethylenes, polybutenes, polystyrenes, ethylene-vinyl acetate copolymers, ethylene-ethyl acrylate copolymers, ethylene-methyl acrylate copolymers, ethylene-propylene rubbers, ethylene-butene rubbers, olefin-based elastomers such as poly(propylene-ethylene/propylene) copolymers, and styrene-based elastomers. Styrene-based elastomers can include, for example, block copolymers having segments of polystyrene and rubber or elastomeric segments. Exemplary elastomers include polybutadienes such as SBS and SBR, polyisoprenes such as SIS and SER, and hydrogenated products of elastomers such as SEBS, HSBR, SEPS, HSIR. Ionomer resins, in which a metal ion has been introduced into a molecule can also be used as the second polymer, according to this invention.

The exemplary second polymers described above may be used alone or in combination.

First polymers satisfying feature (a) also are not particularly limited, so long as the subject polymer has an immersion saturated water absorption rate of about 3% or less. Preferably, the first polymer has a good affinity for the filler. More preferably, the polymer has a functional group. Exemplary functional groups include carboxylic acid groups, carboxylic anhydride groups, epoxy groups, amido groups, amino groups, silicon-modified groups such as Si—O groups, and the like. Among the exemplary first polymers having functional groups, polymers having acid anhydride groups have a high affinity for inorganic fillers and in particular for metal hydroxides.

The above-described functional groups can be introduced to the first polymer by copolymerizing monomers having the functional groups, or graft-copolymerizing monomers having the functional groups onto a skeleton polymer. The functional groups are preferably introduced into the polymer before the polymer is mixed with the filler particles. Exemplary monomers for introducing carboxylic acid groups or carboxylic anhydride groups into the first polymer include unsaturated carboxylic acids and their anhydrides or esters. Of such compounds, maleic acid, fumaric acid, their anhydrides, monoesters, diesters, and the like are preferred. Exemplary monomers for introducing epoxy groups to the first polymer include compounds having a glycidyl groups such as glycidyl methacrylate and the like.

The ratio of the monomer having a functional group to the total polymer weight can be from about 0.01% to about 30% by weight, and preferably from about 0.1% to about 10% by weight. Polymers to which a functional group is introduced also are not particularly limited. Exemplary polymers include those previously described as suitable for use as the second polymer.

According to feature (b) of this invention, described above, the first polymer has a crystallinity of less than about 50% and the second polymer has a crystallinity of at least about 50%.

Second polymers satisfying feature (b) are not particularly limited, provided that the polymers have a crystallinity of at least about 50% or more. According to this invention, polymers that are known as engineering plastics, such as polyamide-based polymers, polyester-based polymers, and the like, can be used as alternatives to the polymers previously described as second polymers satisfying feature (a).

First polymers satisfying feature (b) are not particularly limited, so long as the polymers have a crystallinity of less than about 50%. Again, polymers having functional groups, as described above, are preferable. Exemplary functional groups are listed above with respect to first polymers satisfying feature (a).

Examplary first polymers that satisfy feature (b) include ultra low density polyethylenes, ethylene-vinyl acetate copolymers, ethylene-ethyl acrylate copolymers, ethylene-methyl acrylate copolymers, ethylene-propylene rubbers, ethylene-butene rubbers, olefin-based elastomers such as poly(propylene-ethylene/propylene) copolymers and the like, and styrene-based elastomers. Styrene based elastomers include block copolymers having segments of polystyrene and rubber phases. Such compounds include polybutadienes such as SBS and SBR, polyisoprenes such as SIS and SER and hydrogenated products of such compounds such as SEBS, HSBR, SEPS and HSIR. Ionomer resins may also be employed.

According to feature (c) of this invention, the first polymer has a melting point or a softening temperature of less than about 100° C., and the second polymer has a melting point or a softening temperature of at least about 100° C. "Softening temperature," as used herein, refers to a Vicat softening temperature measured in accordance with JIS K 7206:1999.

Second polymers satisfying feature (c) are not particularly limited, so long as the polymers have a melting point or a softening temperature of about 100° C. or more. Polymers that are known as engineering plastics, such as polyamide-based polymers, polyester-based polymers such as PET, PEN, and the like can be used as alternatives to the polymers described above as second polymers satisfying feature (a). Furthermore, elastomers such as polyester-based elastomers, polyamide-based elastomers, and the like, may be used according to this invention.

First polymers satisfying feature (c) can be any polymers having melting points or softening temperatures of at least about 100° C. Polymers having functional groups, as described above, are preferred. Such functional groups should provide a good affinity for the filler.

Exemplary polymers satisfying feature (c) include low density polyethylenes, ultra low density polyethylenes, ethylene-vinyl acetate copolymers, ethylene-ethyl acrylate copolymers, ethylene-methyl acrylate copolymers, ethylene-propylene rubbers, ethylene-butene rubbers, olefin-based elastomers such as poly(propylene-ethylene/propylene) copolymers and the like, and styrene-based elastomers. Styrene-based elastomers include block copolymers having segments of polystyrene and rubber segments. Such compounds include polybutadienes such as SBS and SBR, polyisoprenes such as SIS and SER, and hydrogenated products of such compounds such as SEBS, HSBR, SEPS and HSIR. Ionomer resins can also be employed.

Preferably the hardness of the second polymer exceeds the hardness of the first polymer. "Hardness," as referred to herein, is a durometer hardness measured in accordance with JIS K 7215:1986.

Also, preferably, the flexural modulus of the second polymer exceeds the flexural modulus of the first polymer. The flexural modulus of the first polymer is preferably less than 50 MPa, while that of the second polymer is preferably greater than 200 MPa. "Flexural modulus," as referred to herein, is the flexural modulus as measured in accordance with JIS K 7203, JIS K 7171 and JIS K 7106.

Preferred first polymers according to this invention having good affinity for a filler are polymers having a carboxylic acid group or an acid anhydride group. Such polymers include acid anhydride-modified ethylene-vinyl acetate copolymers, acid anhydride-modified ethylene-ethyl acrylate copolymers, acid anhydride-modified ethylene-propylene rubbers, acid anhydride-modified low density polyethylenes, acid anhydride-modified linear low density polyethylenes and acid anhydride-modified poly(propylene-ethylene/propylene) copolymers. Exemplary polymers also include acid anhydride-modified thermoplastic elastomeric block copolymers containing polystyrene segments that are relatively hard, and polyalkene segments that are softer and provide elastomeric properties. Such compounds include, but are not limited to, acid anhydride-modified styrene-butadiene rubbers and acid anhydride-modified hydrogenated styrene-butadiene rubbers.

When such a polymer modified with carboxylic acid or acid anhydride is employed as the first polymer, the composition should preferably contain no component, other than the metal hydroxide, which reacts with the carboxylic acid or anhydride group of the first polymer. It is desired that the first polymer bonds directly to the metal hydroxide during mixing or extrusion, to improve the mixing or dispersion of the metal hydroxide particles in the composition.

It is also preferable that at least one of the first and second polymers is relatively soft. In particular, in preferred embodiments at least one of the first and second polymers has a Shore D hardness of not more than about 50.

The proportions of the filler, the first polymer and the second polymer, in compositions according to this invention, may be selected according to the particular identity of these components and the intended use of the wire comprising the resin composition. It is preferred that the second polymer or polymers constitute at least about 50% by weight, more preferably from about 60% to about 97% by weight of the total polymer content. The first polymer or polymers is preferably present at about 50% or less, preferably from about 3% to about 40%, by weight of the total polymer content.

The process for producing a resin composition according to this invention is not particularly limited. Generally, the resin composition is produced by kneading the filler and the first polymer, and subsequently kneading the obtained mixture and the second polymer. Alternatively, the resin composition of this invention can be produced by simultaneously kneading the filler, the first polymer and the second polymer. In either case, when the first polymer has high affinity for the filler, it more easily adheres to the filler than the second polymer. Accordingly, a morphology in which the first polymer coats the filler particles and the second polymer fills the space between the coated filler particles is achieved. Such morphology is known as a "spotted" or "island" structure in which the second polymer is in "continuous phase" and the coated filler particles are in "discontinuous phase". The morphology of resin compositions can be observed in micrographs of the compositions, as illustrated below in the Examples.

The resin composition can be applied to an electrical conductor to form an insulating covering by any known or later developed method. In particular, the resin composition can be applied to a conductor by extrusion. Preferably, the conductor is covered with the composition to thickness of from about 0.15 to about 0.35 mm, more preferably from about 0.2 mm to about 0.3 mm. If the coating thickness is less than about 0.2 mm, the covered wire may have reduced wear resistance, but may be satisfactory for some purposes. If the coating thickness is more than about 0.3 mm, the covered wire may have reduced flexibility, but may be satisfactory for some purposes.

In addition to the above-described components, various conventional compounding agents can be added to the resin composition according to this invention depending on the use of the wire to which the composition is applied. Exemplary compounding agents include thermal stabilizers (oxidation inhibitors and the like), metal deactivators (copper inhibitors and the like), lubricants (fatty acid-based lubricants, fatty acid amide-based lubricants, metal soaps, hydrocarbon-based lubricants (waxes), ester-based lubricants, silicone-based lubricants and the like), coupling agents, softening agents (process oils and the like), crosslinking agents and the like.

In various exemplary embodiments, the polymers of the resin composition are not cross-linked. In such embodiments, the composition is free from cross-linking agents, such as peroxide. Further, in various exemplary embodiments, the composition, as applied as a wire covering, is free from cross-linking agents and decomposition products of cross-linking agents.

The resin composition of this invention can be crosslinked if desired. For example, such cross linking may be desirable in applications where high heat resistance is required. Crosslinking can be carried out using chemical crosslinking agents or using radiation such as ultraviolet radiation, electron beam radiation, and the like.

The first and second polymers of this invention are preferably halogen-free. In various exemplary embodiments, the first and second polymers are the only polymers present in the resin composition.

EXAMPLES

This invention is illustrated by the following Examples, which are merely for the purpose of illustration and are not to be regarded as limiting the scope of the invention, or the manner in which it may be practiced. In the Tables, quantities are given in parts by weight. Some Examples of the invention appear repeatedly, in order to clearly demonstrate various comparisons with the Comparative Examples. Quantities in the tables are given in parts by weight.

Examples 1 to 6 and Comparative Examples 1 to 4

The components shown in Tables 1 and 2 were mixed in the amounts shown, and kneaded by a twin-screw extruder (screw diameter: 32 mm) at a screw rotational speed of 200 rpm to obtain pellets. The kneading temperature was 250° C. to 260° C. for Examples 1, 4, 5 and 6 and Comparative Examples 1 to 3, and 180° C. to 230° C. for the other Examples.

The pellets obtained were dried and extrusion-molded to a coating thickness of 0.28 mm around a conductor having a 0.5 mm² cross-section. The conductor was formed of seven soft copper wires having a diameter of 0.30 mm. Die nipples having diameters of 0.93 mm and 1.45 mm were used for extrusion molding. The extrusion temperature of the die was 180° C. to 250° C. and 160° C. to 240° C. for the cylinder. The extrusion molding was carried out at a linear velocity of 100 m/min.

The coated resin composition was subjected to electron beam radiation in Examples 2 and 3 and Comparative Examples 3 and 4. Electron beam irradiation was conducted using EPS-750KV. The resin compositions were subjected to 120 KGy of radiation.

The hydrothermal resistance of the coated electric wire obtained by the above-described method was tested in accordance with ISO 6722. When the insulation resistance value was $1 \times 10^9$ Ω·mm or more after 35 days, the sample was regarded as passing.

The results are shown in Tables 1 and 2.

TABLE 1

| Example No. | 1 | 2 | 3 | 4 | 5 | 6 |
|---|---|---|---|---|---|---|
| First polymer | | | | | | |
| EVA[1] | | 20 | 60 | | | |
| MAH-EVA[2] | 30 | 20 | | | 20 | |
| MAH-SEBS[3] | | | | 30 | 30 | 30 |
| Ionomer[4] | | | | | | 10 |
| Second polymer | | | | | | |
| PP[5] | 70 | | | 50 | 50 | 60 |
| HDPE[6] | | 60 | 40 | | | |
| LLDPE[7] | | | | 20 | | |
| Magnesium hydroxide[8] | 100 | 120 | 90 | 180 | 200 | 80 |
| Antioxidant[9] | 1 | 1 | 1 | 1 | 1 | 1 |
| Crosslinking agent[10] | | | 5 | 5 | | |
| Total | 201 | 226 | 196 | 281 | 301 | 181 |
| Hydrothermal resistance | Pass | Pass | Pass | Pass | Pass | Pass |

In Table 1:
[1]EVA (ethylene-vinyl acetate copolymer): EV360 manufactured by Mitsui DuPont Chemical Co., Ltd.; saturated water absorption rate: 1% or less.
[2]MAH-EVA (ethylene-vinyl acetate copolymer modified with maleic anhydride): HPR VR103 manufactured by Mitsui DuPont Chemical Co., Ltd.; saturated water absorption rate: 1% or less.
[3]MAH-SEBS (hydrogenated block copolymer of styrene and butadiene, modified with maleic anhydride): TUFTEC M1913 manufactured by Asahi Kasei Corporation; saturated water absorption rate: 1% or less; MFR = 5.0 g/10 minutes at a density of 0.92, temperature of 230° C., and a load of 2.16 kg.
[4]Ionomer: HIMILAN 1706 manufactured by Mitsui DuPont Chemical Co., Ltd.; saturated water absorption rate: 1% or less.
[5]PP: (polypropylene/polyethylene block copolymer with more than 50 weight % propylene): RB610A manufactured by Tokuyama Corporation; saturated water absorption rate: 1% or less; MFR = 0.5 g/10 minutes at a density of 0.90, temperature of 230° C., and a load of 2.16 kg.
[6]HDPE: HIZEX 5305E manufactured by Mitsui Chemical Co., Ltd.; saturated water absorption rate: 1% or less.
[7]LLDPE: DFDJ 7540 manufactured by Japan Uniker Co., Ltd.; saturated water absorption rate: 1% or less.
[8]Magnesium Hydroxide: Manufactured by Kyowa Chemicals Co., Ltd.
[9]Antioxidant (a hindered phenol-based antioxidant): TOMINOX TT manufactured by Yoshitomi Fine Chemicals, Ltd.
[10]Crosslinking agent: ESTER TMPT manufactured by New Nakamura Chemical Co., Ltd.

TABLE 2

| Comparative Example No. | 1 | 2 | 3 | 4 |
|---|---|---|---|---|
| First polymer | | | | |
| EVA[1] | | | 30 | |
| MAH-EVA[2] | | 20 | 10 | |
| MAH-SEBS[3] | | | | |
| Ionomer[4] | | | | |
| Second polymer | | | | |
| PP[5] | 100 | 50 | | |
| HDPE[6] | | | 30 | |
| LLDPE[7] | | | | 100 |
| Nylon 6[11] | | 30 | 30 | |
| Magnesium hydroxide[8] | 90 | 50 | 150 | 100 |
| Antioxidant[9] | 1 | 1 | 1 | 1 |
| Crosslinking agent[10] | | | 4 | 4 |
| Total | 191 | 151 | 255 | 251 |
| Hydrothermal resistance | Reject | Reject | Reject | Reject |

In Table 2:
[1-10]See Table 1.
[11]Nylon 6: 1013B by UBE Industries Co., Ltd.; saturated water absorption rate: 10% or more.

Examples 10 to 14 and Comparative Examples 5 to 9

Coated electrical wires were produced by the same procedure as described with respect to Examples 1 to 6, using the components shown in Tables 3 and 4. Further, electron beam irradiation was carried out in Examples 11 and 12 and Comparative Example 6 under the same conditions as in Examples 2 and 3, to provide cross-linking.

The oil resistance, whitening property and flexibility of the obtained coated electric wire were measured by methods described below.

To evaluate oil resistance, after the coated wire had been immersed for 48 hours in an engine oil (IRM 902 prescribed by ISO 1817) at 100° C., tensile strength and elongation at break were measured at marked line intervals of 20 mm and a tensile linear velocity of 200 mm/min. Coated wire having a tensile strength of 10 MPa or more and having an elongation of 125% or more at break were regarded as passing.

The presence or absence of whitening was inspected after winding the wire on its own diameter. Wire in which whitening did not occur was regarded as passing.

The flexibility of wire was evaluated in terms of workability in general operations, such as bundling electric wire. The flexibility of the coated wire was determined by touch.

The results are shown in Tables 3 and 4.

TABLE 3

| Example No. | 10 | 11 | 12 | 13 | 14 |
|---|---|---|---|---|---|
| First polymer | | | | | |
| EVA[1] | | 20 | 60 | | |
| MAH-EVA[2] | 30 | 20 | | | 20 |
| MAH-SEBS[3] | | | | 30 | 30 |

TABLE 3-continued

| Example No. | 10 | 11 | 12 | 13 | 14 |
|---|---|---|---|---|---|
| Second polymer | | | | | |
| PP[5] | 70 | | | 50 | 50 |
| HDPE[6] | | 60 | 40 | | |
| LLDPE[7] | | | | 20 | |
| Magnesium hydroxide[8] | 100 | 120 | 90 | 180 | 200 |
| Antioxidant[9] | 1 | 1 | 1 | 1 | 1 |
| Crosslinking agent[10] | | 5 | 5 | | |
| Total | 201 | 226 | 196 | 281 | 301 |
| Oil resistance | Pass | Pass | Pass | Pass | Pass |
| Whitening | Pass | Pass | Pass | Pass | Pass |
| Flexibility | Good | Good | Good | Good | Good |

In Table 3:
[1]EVA: see Table 1; crystallinity = 30% or less.
[2]MAH-EVA: see Table 1; crystallinity = 30% or less.
[3]MAH-SEBS: see Table 1; crystallinity = 30% or less.
[5]PP: see Table 1; crystallinity = 60%.
[6]HDPE: see Table 1; crystallinity = 85%.
[7]LLDPE: see Table 1; crystallinity = 70%.
[8–10]See Table 1.

TABLE 4

| Comparative Example No. | 5 | 6 | 7 | 8 | 9 |
|---|---|---|---|---|---|
| First polymer | | | | | |
| EVA[1] | | | 100 | 50 | |
| MAH-EVA[2] | | | | 50 | |
| MAH-SEBS[3] | | | | | 100 |
| Second polymer | | | | | |
| PP[5] | 100 | | | | |
| HDPE[6] | | 100 | | | |
| LLDPE[7] | | | | | |
| Magnesium hydroxide[8] | 90 | 70 | 150 | 100 | 140 |
| Antioxidant[9] | 1 | 1 | 1 | 1 | 1 |
| Crosslinking agent[10] | | 4 | | | |
| Total | 191 | 155 | 251 | 201 | 241 |
| Oil resistance | Pass | Pass | Reject | Reject | Reject |
| Whitening | Reject | Reject | Pass | Pass | Pass |
| Flexibility | Bad | Bad | Good | Good | Good |

In Table 4:
[1–3, 5–10]See Tables 1 and 3.

Examples 15 to 19 and Comparative Examples 10 to 13

Coated electrical wires were produced by the same procedure as described above with respect to Examples 1 to 6, using the components shown in Tables 5 and 6. Further, electron beam irradiation was carried out in Examples 16 and 17 and Comparative Example 11 under the same conditions as in Examples 2 and 3.

The flexibility and whitening property were determined as above, and melt fusion and heat deformation property of the coated wires were measured by methods set forth below.

To evaluate melt fusion, the coated electric wire was wound on a cylinder of its own diameter and heated at 100° C. for 30 minutes. The presence or absence of melt fusion was observed. Samples in which melt fusion was not observed were regarded as passing.

The evaluate heat deformation, a coated electric wire was loaded at 500 gf and retained at 100° C. for 30 minutes. The deformation ratio, which is a ratio of the change in thickness of the wire after testing, to the thickness of the wire prior to the test, was determined. Samples having a deformation ratio of 30% or less were regarded as passing.

The results are shown in Tables 5 and 6.

TABLE 5

| Example No. | 15 | 16 | 17 | 18 | 19 |
|---|---|---|---|---|---|
| First polymer | | | | | |
| EVA[1] | | 20 | 60 | | |
| MAH-EVA[2] | 30 | 20 | | | 20 |
| MAH-SEBS[3] | | | | 30 | 30 |
| Second polymer | | | | | |
| PP[5] | 70 | | | 50 | 50 |
| HDPE[6] | | 60 | 40 | | |
| LLDPE[7] | | | | 20 | |
| Magnesium hydroxide[8] | 100 | 120 | 90 | 180 | 200 |
| Antioxidant[9] | 1 | 1 | 1 | 1 | 1 |
| Crosslinking agent[10] | | 5 | 5 | | |
| Total | 201 | 226 | 196 | 281 | 301 |
| Flexibility | Good | Good | Good | Good | Good |
| Whitening | Pass | Pass | Pass | Pass | Pass |
| Melt fusion | Pass | Pass | Pass | Pass | Pass |
| Heating deformation property | Pass | Pass | Pass | Pass | Pass |

In Table 5:
[1]EVA: see Table 1; melting point = 77° C.
[2]MAH-EVA: see Table 1; melting point = 60° C.
[3]MAH-SEBS: see Table 1; softening temperature = 90° C.
[5]PP: see Table 1; melting point = 168° C.
[6]HDPE: see Table 1; melting point = 132° C.
[7]LLDPE: see Table 1; melting point = 124° C.
[8–10]See Table 1.

TABLE 6

| Comparative Example No. | 10 | 11 | 12 | 13 |
|---|---|---|---|---|
| Fist polymer | | | | |
| EVA[1] | | | 80 | 50 |
| MAH-EVA[2] | | | 20 | |
| MAH-SEBS[3] | | | | 50 |
| Second polymer | | | | |
| PP[5] | 100 | | | |
| HDPE[6] | | 50 | | |
| LLDPE[7] | | 50 | | |
| Magnesium hydroxide[8] | 90 | 80 | 150 | 100 |
| Antioxidant[9] | 1 | 1 | 1 | 1 |
| Crosslinking agent[10] | | 4 | | |
| Total | 191 | 185 | 251 | 201 |
| Flexibility | Bad | Bad | Good | Good |
| Whitening | Reject | Reject | Pass | Pass |
| Melt fusion | Pass | Pass | Reject | Reject |
| Heating deformation property | Pass | Pass | Reject | Reject |

In Table 6:
[1–3, 5–10]See Tables 1 and 5.

Examples 20 to 23

Coated electrical wires were produced by the same procedure as in Examples 1 to 6, using the components shown in Table 7. Electron beam irradiation was carried out in Example 21 under the same conditions as in Examples 2 and 3, for cross-linking.

The wear resistance and flexibility of the coated electric wire obtained by the above-described procedure were measured by methods set out below.

Wear resistance was measured in accordance with JASO (Japan Automobile Standards Organization) D 611-94. The wear resistance was measured by a blade reciprocating method. A test piece was made by cutting the coated wire to a length of 750 mm. A blade was reciprocated over a length of 10 mm in the axis direction on the surface of the coating material of the test piece, which was fixed on a stand at room temperature (25° C.). The coating material was then worn. The number of reciprocating cycles required for the blade to reach the conductor was measured. The blade was reciprocated with a load of 7N at a speed of 50 cycles per minute.

The test piece was subsequently moved by 100 mm and rotated 90 degrees in the clockwise direction, and the above measurement was repeated. The measurement was repeated 3 times for the same test piece, and those in which the minimum value was 150 cycles or more were regarded as passing.

Flexibility was determined as in Examples 10 to 14.

The results are shown in Table 7.

TABLE 7

| Example No. | 20 | 21 | 22 | 23 |
|---|---|---|---|---|
| First polymer | | | | |
| MAH-EVA[2] | 30 | 20 | | 20 |
| MAH-SEBS[3] | | | 30 | 30 |
| EVA[1] | | 20 | | |
| Second polymer | | | | |
| PP[5] | 70 | | 50 | 50 |
| HDPE[6] | | 60 | | |
| LLDPE[7] | | | 20 | |
| Magnesium hydroxide[8] | 100 | 120 | 180 | 200 |
| Antioxidant[9] | 1 | 1 | 1 | 1 |
| Crosslinking agent[10] | | 5 | | |
| Total | 201 | 226 | 281 | 301 |
| Wear resistance | Pass | Pass | Pass | Pass |
| Flexibility | Good | Good | Good | Good |

In Table 7:
[1]EVA: see Table 1; Shore A hardness 85 (Shore D hardness 30).
[2]MAH-EVA: see Table 1; Shore A hardness 60 (Shore D hardness 20 or less).
[3]MAH-SEBS: see Table 1; Shore A hardness 84 (Shore D hardness 29).
[5]PP: see Table 1; Shore D hardness 68.
[6]HDPE: see Table 1; Shore D hardness 64.
[7]LLDPE: see Table 1; Shore D hardness 52.
[8-10]See Table 1.

Examples 24 to 27

Coated electrical wires were produced by the same procedure as in Examples 1 to 6, using the components shown in Tables 9 and 10. Electron beam irradiation was carried out in Example 25 under the same conditions as in Examples 2 and 3, for cross-linking.

The wear resistance and whitening property of the coated electric wire obtained by the above procedure were measured by the above-described methods.

The results are shown in Table 8.

TABLE 8

| Example No. | 24 | 25 | 26 | 27 |
|---|---|---|---|---|
| First Polymer | | | | |
| MAH-EVA[2] | 30 | 20 | | 20 |
| MAH-SEBS[3] | | | 30 | 30 |
| EVA[1] | | 20 | | |
| Second polymer | | | | |
| PP[5] | 70 | | 50 | 50 |
| HDPE[6] | | 60 | | |

TABLE 8-continued

| Example No. | 24 | 25 | 26 | 27 |
|---|---|---|---|---|
| LLDPE[7] | | | 20 | |
| Magnesium hydroxide[8] | 100 | 120 | 180 | 200 |
| Antioxidant[9] | 1 | 1 | 1 | 1 |
| Crosslinking agent[10] | | 5 | | |
| Total | 201 | 226 | 281 | 301 |
| Wear resistance | Pass | Pass | Pass | Pass |
| Whitening property | Good | Good | Good | Good |

In Table 8:
[1]EVA: see Table 1; flexural modulus = 26 MPa (determined according to JIS K 7106).
[2]MAH-EVA: see Table 1; flexural modulus = 25 MPa (determined according to JIS K 7106).
[3]MAH-SEBS: see Table 1; flexural modulus = 24 MPa (determined according to JIS K 7106).
[5]PP: see Table 1; flexural modulus = 1160 MPa (determined according to JIS K 7203, which is no longer used, JIS K 7106 gives similar values).
[6]HDPE: see Table 1; flexural modulus = 1000 MPa (determined according to JIS K 7203).
[7]LLDPE: see Table 1; flexural modulus = 280 MPa (determined according to JIS K 7203).
[8-10]See Table 1.

Examples 28–37

In Examples 28 to 32 of this invention, the components in Table 9 were kneaded at the ratios shown to prepare resin compositions.

Using an extrusion molding machine, each composition was applied at a thickness of 0.28 mm to a conductor (seven soft copper wires twisted together and circularly compressed to give a smooth peripheral surface) having a cross-sectional area of 0.5 mm$^2$ to prepare an electrical wire. The die nipples used in the extrusion molding were of a diameter of 1.40 mm and 0.88 mm. The extrusion temperature of the die was 210° C. to 230° C. The extrusion temperature of the cylinder was 200° C. to 240° C. The linear speed was 50 m/minute.

In Examples 33 to 37, the same components as in Examples 28 to 32 were kneaded at the ratios shown in Table 10 to prepare compositions particularly selected to be suitable for use in electrical wire having a small diameter. Using an extrusion molding machine, each composition was applied at a thickness of 0.20 mm to a conductor (seven soft copper wires twisted together and circularly compressed to give a smooth peripheral surface) having a cross-sectional area of 0.13 mm$^2$ to prepare the covered wire. The die nipples used in the extrusion molding had diameters of 0.50 mm and 0.90 mm. The extrusion temperature of the die was 210° C. to 230° C. The extrusion temperature of the cylinder was 200° C. to 240° C. The linear speed was 50 m/minute.

The covered electrical wires of Examples 28 to 37 were tested to examine fire resistance, wear resistance, tensile strength, tensile elongation, flexibility, and processability, as given below.

A fire resistance test was conducted in accordance with JASO D611-94 of the Japanese Automobile Standards Organization. The electrical wire was cut to a length of 300 mm to prepare a specimen. Each specimen was put in a test box made of iron and supported horizontally. In this state, using a Bunsen burner having a bore of 10 mm, the tip of a reducing flame was applied to the underside of the center of each specimen so that the specimen was burnt for 30 seconds. An after-flame time for each specimen was measured. Specimens having an after-flame time of less than 15 seconds were regarded as passing.

Wear resistance was measured in accordance with JASO D611-94, as described above. In examples 28 to 32, specimens for which the blade reciprocated more than 150 times were regarded as passing. In Examples 33 to 37, specimens for which the blade reciprocated more than 100 times were regarded as passing.

In accordance with JASO D611-94, tensile strength and tensile elongation tests were conducted. Each covered electrical wire was cut to a length of 150 mm to prepare specimens. The conductor was removed from the specimen to make a tubular body. Lines were marked on the center of the specimen at intervals of 50 mm. At a room temperature of 23±5° C. the ends of the specimen were mounted on chucks of a tensile testing machine. Then, the specimen was drawn at a speed of 200 m/minute to measure load and the length between adjacent marked lines when the specimen was broken. Specimens having a tensile strength of more than 15.7 MPa and a tensile elongation of more than 125% were regarded as passing.

To test flexibility, specimens which gave a good feeling when they were bent by hand were regarded as passing.

To evaluate processability, a part of the resin composition disposed at the end of each covered wire was peeled off from the conductor to check whether a whisker was formed. Specimens in which no whisker was formed were regarded as passing.

The results are shown in Tables 9 and 10.

TABLE 9

| Example No. | 28 | 29 | 30 | 31 | 32 |
|---|---|---|---|---|---|
| PP[5] | 60 | 97 | 80 | 90 | 80 |
| MAH-SEBS[3] | 40 | 3 | 20 | 10 | 20 |
| Magnesium hydroxide A[14] | 70 | 90 | — | — | 90 |
| Magnesium hydroxide B[15] | — | — | 50 | 200 | — |
| Antioxidant[9] | 1 | 1 | 1 | 1 | 1 |
| Total (parts by weight) | 171 | 191 | 151 | 301 | 191 |
| Fire resistance | Pass | Pass | Pass | Pass | Pass |
| Wear resistance (reciprocation number of blade) | 500 | 1800 | 4000 | 300 | 2000 |
| Tensile strength (MPa) | 28 | 31 | 34 | 23 | 33 |
| Tensile elongation (%) | 200 | 420 | 520 | 160 | 320 |
| Flexibility | Good | Good | Good | Good | Good |
| Processability | Pass | Pass | Pass | Pass | Pass |

In Table 9:
[3, 5, 9]See Table 1.
[14]magnesium hydroxide A: manufactured by Kyowa Chemicals Co., Ltd.; average diameter of particles: 1.0 μm; surface-treated with a vinyl silane coupling agent.
[15]magnesium hydroxide B: manufactured by Kyowa Chemicals Co., Ltd.; average diameter of particles: 1.0 μm; not surface-treated.

TABLE 10

| Example No. | 33 | 34 | 35 | 36 | 37 |
|---|---|---|---|---|---|
| PP[5] | 95 | 90 | 80 | 65 | 80 |
| MAH-SEBS[3] | 5 | 10 | 20 | 35 | 20 |
| Magnesium hydroxide B[14] | 120 | 150 | 200 | 160 | 100 |
| Antioxidant[9] | 1 | 1 | 1 | 1 | 1 |
| Total (parts by weight) | 221 | 251 | 301 | 261 | 201 |
| Fire resistance | Pass | Pass | Pass | Pass | Pass |
| Wear resistance (reciprocation number of blade) | Over 500 | Over 500 | Over 500 | 180 | Over 500 |
| Tensile strength (MPa) | 32 | 30 | 32 | 30 | 29 |
| Tensile elongation (%) | 260 | 220 | 210 | 250 | 265 |
| Flexibility | Good | Good | Good | Good | Good |
| Processability | Pass | Pass | Pass | Pass | Pass |

In Table 10:
[3, 5, 9]See Table 1.
[15]See Table 9.

The coated wire of each of the Examples 28 to 37 of this invention was satisfactory in fire resistance, wear resistance, tensile strength, tensile elongation, flexibility and processability. In particular, the resin compositions of each of Examples 30 and 32, as shown in Table 9, had desirable mechanical strength properties including wear resistance, tensile strength and tensile elongation. Further, these Examples had a good balance between these characteristics. Each of these compositions contained 70 to 90 parts by weight of propylene resin and 10 to 30 parts by weight of styrene thermoplastic elastomer modified with an unsaturated carboxylic acid or its derivative, and 50 to 150 parts by weight of the metal hydroxide per 100 parts by weight of the mixture.

In this invention, when the filler and the first polymer are dispersed in the second polymer in a specified morphology, the formation of voids at the filler/polymer interface can be prevented, and the water resistance and oil resistance of the resin can be improved. Further, the flexibility, high temperature deformation property, wear resistance, whitening resistance property and the like of the resin composition can be remarkably improved by appropriately selecting the physical properties of the first polymer and the second polymer.

Examples 38 and 39 illustrate this preferred morphology, obtainable by this invention.

Example 38

80 parts by weight of the propylene-ethylene block copolymer (PP), 20 parts by weight of the styrene-based elastomer (MAH-SEBS) and 90 parts by weight of untreated magnesium hydroxide, each described above, were kneaded with a twin-screw extruder at 250° C. A micrograph of the resulting composition was produced using a transmission electron microscope (TEM) (model H-800 by HITACHI) at an acceleration voltage of 100 KV. The sample was cut to a thickness of about 10 μm with a microtome for an electron microscope, and the cut sample was dyed with ruthenic acid (2% aqueous solution) for 2 hours. The dyed sample was subsequently mounted in an epoxy resin, and a micrograph was obtained by an ultra thin intercept method. The micrograph is shown in FIG. 1.

As seen in FIG. 1, the approximately hexagonal particles which are situated at the central part of the picture and the surrounding narrow long particles are the particles of magnesium hydroxide. The dense portion forming a rim around each of these particles is the polymer MAH-SEBS which coats the particles, and the material filling the space between the particles is the continuous matrix phase of the polymer PP. FIG. 1 shows that the filler particles hardly coagulate, and are finely dispersed in the continuous phase of the polymer PP.

When applied as a covering to a wire conductor, this resin composition gives very satisfactory results.

Example 39

A composition was prepared as described with respect to Example 1, except that a hydrogenated styrene-butadiene copolymer, which is similar to MAH-SEBS, but not modified with maleic anhydride (TUFTEC M1041 by Asahi Kasei Corporation), was used in place of MAH-SEBS. A micrograph was obtained and is shown in FIG. 2.

Figure 2:
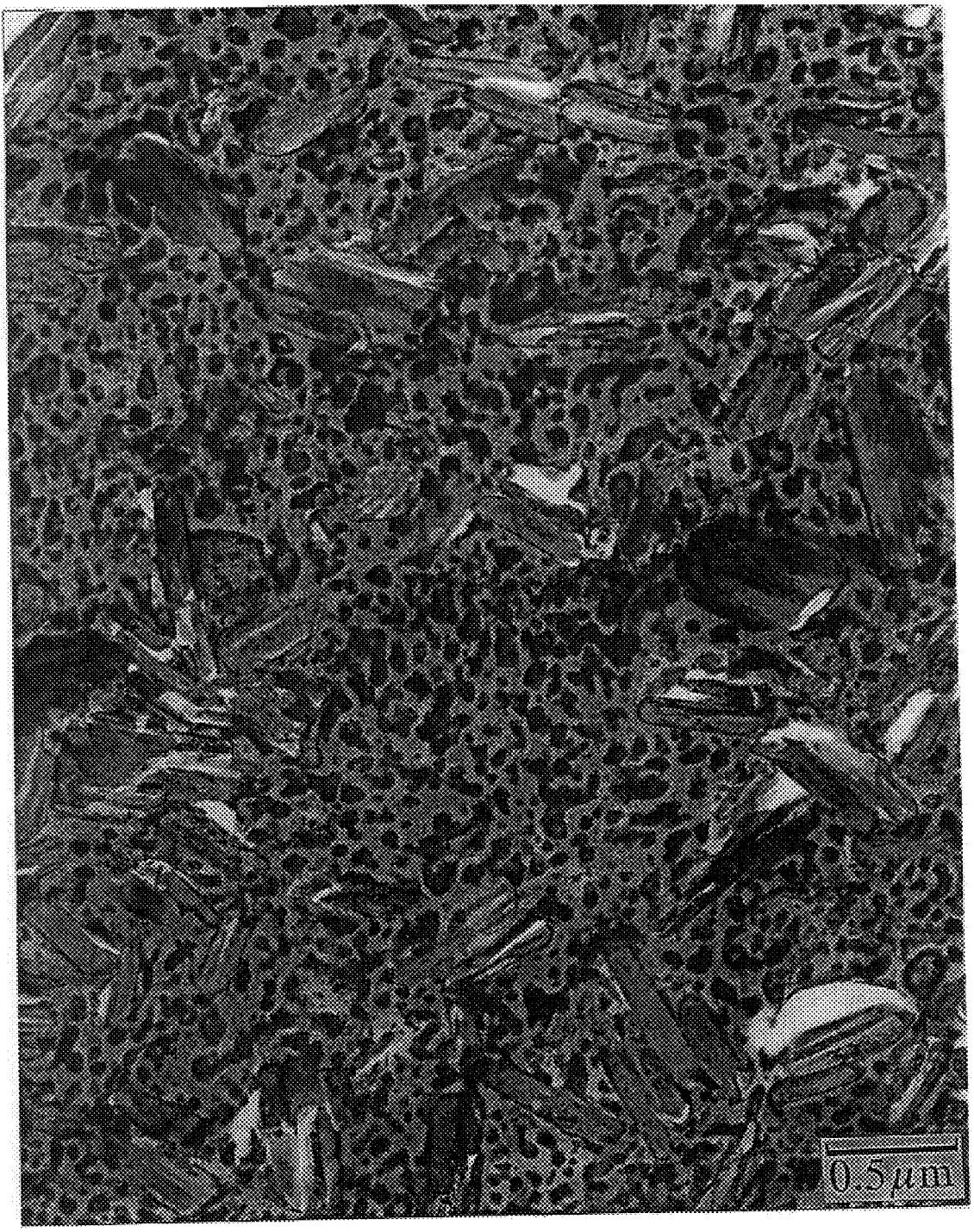
FIG. 2 is an electron micrograph of the structure of the resin composition of Example 39.

Comparison of FIGS. 1 and 2 shows that the styrene-based polymer modified by unsaturated carboxylic acid, by reason of its affinity with the magnesium hydroxide filler particles, forms the structure of the mixture in which it surrounds the particles preferentially. This is advantageous for the properties of the composition as a wire covering.

While this invention has been described in conjunction with the specific embodiments above, it is evident that many alternatives, combinations, modifications, and variations are apparent to those skilled in the art. Accordingly, the exemplary embodiments of this invention, as set forth above are intended to be illustrative, and not limiting. Various changes can be made without departing from the spirit and scope of this invention.

What is claimed is:

1. An electrical wire, comprising:
   a conductor; and
   an electrically insulating covering on the conductor; wherein:
   the covering is a resin composition comprising at least one first polymer, at least one second polymer and filler particles;
   the at least one first polymer and the at least one second polymer have an immersion saturated water absorption rate of about 3% or less; and
   the at least one first polymer has a crystallinity of less than about 50% and the at least one second polymer has a crystallinity at least about 50%.

2. The electrical wire of claim 1, wherein the at least one first polymer has a melting point or softening temperature of less than 100° C. and the at least one second polymer has a melting point or a softening temperature of at least about 100° C.

3. The electrical wire of claim 1, wherein the at least one first polymer has a higher bonding affinity for the filler particles than the at least one second polymer, and the at least one first polymer bonds the filler particles to the at least one second polymer.

4. The electrical wire of claim 1, wherein the at least one first polymer comprises a functional group effective to bond to the filler particles.

5. The electrical wire of claim 4, wherein the functional group is selected from the group consisting of carboxylic acid groups, carboxylic acid anhydride groups and epoxy groups.

6. The electrical wire of claim 1, wherein the filler is an inorganic filler.

7. The electrical wire of claim 6, wherein the inorganic filler is at least one filler material selected from the group consisting of carbon materials, metal oxides, metal hydroxides, metal carbonates, metal sulfates, metal silicates and metal nitrides.

8. A method of making an electrical wire, comprising:
   forming a resin composition by mixing at least one first polymer, at least one second polymer and filler particles, wherein:
   the at least one first polymer and the at least one second polymer have an immersion saturated water absorption rate of about 3% or less, and
   the at least one first polymer has a crystallinity of less than about 50% and the at least one second polymer has a crystallinity of at least about 50%; and
   applying the resin composition to an electrical conductor to form an electrically insulating covering on the electrical conductor.

9. The method of claim 8, wherein the at least one first polymer has a melting point or softening temperature of less than about 100° C and the at least one second polymer has a melting point or a softening temperature of at least about 100° C.

10. The method of claim 8, wherein the at least one first polymer has a higher bonding affinity to the filler particles than the at least one second polymer, and the at least one first polymer bonds the filler particles to the at least one second polymer.

11. The method of claim 8, wherein the at least one first polymer comprises a functional group effective to bond to the filler particles.

12. The method of claim 11, wherein the functional group is selected from the group consisting of carboxylic acid groups, carboxylic acid anhydride groups and epoxy groups.

13. The method of claim 8, wherein the filler is an inorganic filler.

14. The method of claim 13, wherein the inorganic filler is at least one filler material selected from the group consisting of carbon materials, metal oxides, metal hydroxides, metal carbonates, metal sulfates, metal silicates and metal nitrides.

* * * * *

UNITED STATES PATENT AND TRADEMARK OFFICE
CERTIFICATE OF CORRECTION

PATENT NO. : 6,646,205 B2
DATED : November 11, 2003
INVENTOR(S) : Tatsuya Hase et al.

It is certified that error appears in the above-identified patent and that said Letters Patent is hereby corrected as shown below:

Title page,
Item [30], Foreign Application Priority Data, insert
-- Foreign Application Priority Data
Dec. 12, 1000 (JP)................2000-377498
Mar. 26, 2001 (JP)................2001-087906
Mar. 26, 2001 (JP)................2001-087907
Mar. 26, 2001 (JP)................2000-087908 --

Signed and Sealed this

Seventeenth Day of August, 2004

JON W. DUDAS
*Acting Director of the United States Patent and Trademark Office*